United States Patent [19]
Herweyer

[11] Patent Number: 5,368,013
[45] Date of Patent: Nov. 29, 1994

[54] PARALLEL PIPED FLUID HEATERS WITH STAGED FLOW CONTROLLED BY MAGNETIC PRIORITY VALVES

[76] Inventor: Elliot E. Herweyer, 3055 River Rd. W., P.O. Box 257, Goochland, Va. 23063

[21] Appl. No.: 962,715

[22] Filed: Oct. 19, 1992

[51] Int. Cl.$^5$ .................. F24H 1/00; F16K 31/08
[52] U.S. Cl. ........................ 126/362; 251/65
[58] Field of Search ............ 126/362, 351; 137/522, 137/527; 251/65

[56] References Cited

U.S. PATENT DOCUMENTS

| | | |
|---|---|---|
| 3,204,870 | 9/1965 | Dibert . |
| 3,294,115 | 12/1966 | Koenigsberg et al. . |
| 3,360,007 | 12/1967 | Haidek et al. ............ 251/65 X |
| 3,461,854 | 8/1969 | Toni et al. . |
| 3,502,099 | 3/1970 | Wilson ................... 251/65 X |
| 3,515,163 | 6/1970 | Freeman ................. 251/65 X |
| 3,643,772 | 2/1972 | Begleiter . |
| 3,665,958 | 5/1972 | Dunkelis . |
| 3,964,466 | 6/1976 | Ohringer . |
| 4,406,216 | 9/1983 | Hott et al. . |
| 4,540,400 | 9/1985 | Hooven ................... 251/65 X |
| 4,936,289 | 6/1990 | Peterson . |
| 5,062,443 | 11/1991 | Maric . |
| 5,098,062 | 3/1992 | Lungu . |

FOREIGN PATENT DOCUMENTS

| | | |
|---|---|---|
| 0457066 | 11/1991 | European Pat. Off. ......... 251/65 |
| 1168719 | 4/1964 | Germany . |
| 815028 | 6/1959 | United Kingdom ............ 251/65 |

*Primary Examiner*—Carl D. Price
*Attorney, Agent, or Firm*—Dennison, Meserole, Pollack & Scheiner

[57] ABSTRACT

A system to stage the operation of a bank of parallel piped fluid heaters in order to avoid cycling at low demand and to spread the load evenly among two or more heaters during high demand. Each heater has a check valve at the inlet and a balancing valve at the outlet. The standard swing type check valve is modified by the use of an internal and external magnet to control the opening pressure. By adjusting the opening pressure of the check valves and balancing the system with the balancing valves, heater staged operation can be achieved.

7 Claims, 2 Drawing Sheets

PARALLEL PIPED FLUID HEATERS WITH STAGED FLOW CONTROLLED BY MAGNETIC PRIORITY VALVES

BACKGROUND OF THE INVENTION

This invention relates to a system for controlling a bank of parallel connected hot water heaters supplying hot water to a large institution or apartment complex. The hot water requirements in such installations varies widely during the day. For example, at midnight, one heater may easily handle the load while in the morning hours when people are preparing to go to work, it may take three or more continuously operating heaters. At other times, the load may be modulated between one or more heaters.

Excessive cycling of a hot water heater is known to increase the maintenance costs and to lead to premature failure. Excessive cycling promotes carbon buildup on the burners and combustion surfaces. This is true for both oil and gas fired heaters. Excessive cycling also stresses the ignition and safety circuits of the heater leading to premature failure and possible safety hazards.

Excessive cycling is also wasteful of energy. For increased energy efficiency, a heater should be operated as closely as possible at steady state conditions. In a plural heater system, this means that one heater should be selected as a lead heater and operated with the longest duty cycle while the remaining heaters should be selectively brought into operation as needed.

A number of systems have been invented to stage the heater operation in a system employing a bank of plural, parallel connected heaters. U.S. Pat. No. 3,964,466, issued Jun. 22, 1976, shows plural, parallel connected heaters having a thermostatic modulating valve at the output of each heater. If the temperature in a heater drops to a preset minimum, the thermostatic modulating valve closes, shifting the load to another heater in the bank. U.S. Pat. No. 3,461,854, issued Aug. 19, 1969, shows a bank of parallel connected heaters feeding a large hot water storage tank. The heaters are under control of a pair of thermostats which stage the operation by selectively operating the burners and pumps of the heaters.

While the above-mentioned patents do teach staging of a bank of parallel connected heaters, the prior art does not teach a staging system of simple design free of complicated thermostatic modulating valves and thermostatically controlled pumps.

SUMMARY OF THE INVENTION

The overall object of the present invention is to improve upon the prior art parallel piped heater control systems by reducing the complexity and maintenance costs, and increasing the reliability and thermal efficiency.

It is another object of the invention to stage a bank of parallel piped heaters so as to avoid cycling at low demand and to spread the load evenly among the remaining heaters during increasing demand.

It is a specific object of the invention to stage a plurality of parallel piped heaters by providing a predetermined fluid pressure drop gradient across the check valves conventionally employed at the heater fluid inlets. By relying on fluid pressure drop across the inlet check valves, the heaters may be staged without the use of thermostatically controlled modulating valves and thermostatically controlled pumps. Temperature controlled devices are more expensive, less reliable, and are subject to a slow reaction time leading to undesirable wide temperatures swings in the fluid output temperature.

It is another object of the invention to modify a conventional swing type check valve by installing a magnet internally on the swing valve and biasing the magnet with a second magnet externally mounted on the valve body. The second magnet is provided with an adjustable mounting and indicia to vary the magnetic bias on the valve mounted magnet. In this manner, the standard check valve is modified to open at a presettable cracking pressure.

DESCRIPTION OF THE PREFERRED EMBODIMENTS

Figure 1:
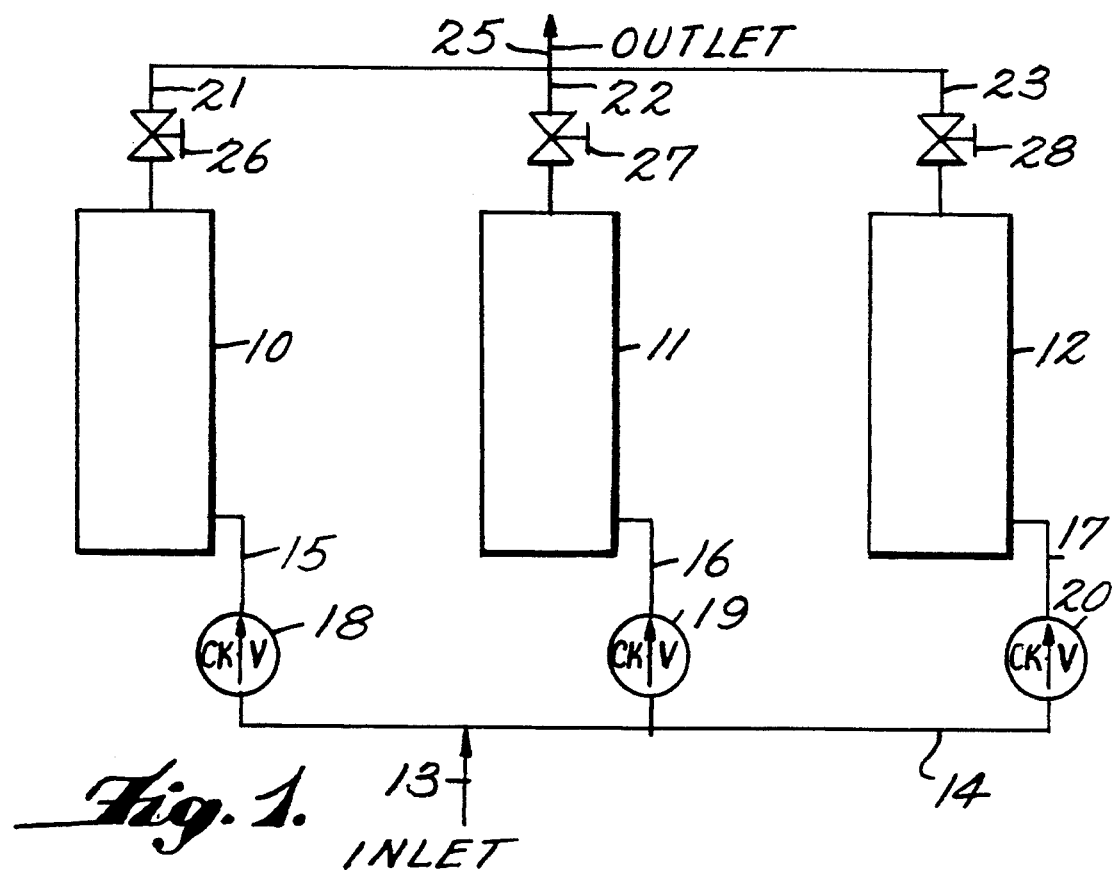
FIG. 1 is a diagrammatic representation of a bank of parallel piped hot water heaters connected in accordance with the invention.

Referring now in general to the drawings, and in particular to FIG. 1, the novel hot water heating system of this invention comprises a bank of hot water heaters 10, 11 and 12. While three heaters are shown for explanatory purposes, it should be understood that the invention is adaptable to any system of two or more heaters.

The heaters are connected in parallel to cold water inlet line 13 which feeds a main cold water distribution line 14. Individual cold water branch lines 15, 16 and 17 connect the heaters 10, 11 and 12, respectively, to the main distribution line 14. Although the cold water inlet system shown in FIG. 1 is symmetrically arranged, in a practical installation, the path lengths and number of fittings connecting each heater to the cold water inlet will vary. As will be explained below, the different pressure drops occasioned by the different path lengths will need to be compensated for in setting up the system.

Each branch line 15, 16 and 17 is provided with a check valve 18, 19 and 20, respectively, to prevent any backflow between the heaters. Swing type check valves are conventionally employed at this location in prior art systems. The crux of this invention resides in the modification of the conventional swing type check valve to yield a predetermined opening pressure. This feature will be discussed in detail in connection with FIGS. 2-4.

Referring back to FIG. 1, the output of each heater 10, 11 and 12 is connected to a hot water branch line 21, 22 and 23, respectively, which feeds a main hot water distribution line 24. A hot water output line 25 feeds hot water to a load. Although only a single output 25 is shown, distribution line 24 may feed a number of outputs to different loads.

Each hot water branch line 21, 22 and 23 is provided with a balancing valve 26, 27 and 28, respectively, to balance the hot water outputs from each heater and to compensate for the uneven pressure drops in the input and output lines connecting the heaters. The provision of such balancing valves is conventional.

The heaters 11, 12 and 13 are conventional. They may be oil or gas fired and are controlled by a water temperature sensing thermostatic which maintains the hot water at a presettable temperature range.

The basic system so far described will operate in an inefficient and unpredictable manner. At low loads, all three heaters may cycle frequently creating the problems described above. At high demand, cold water may shunt one or more of the other heaters to deliver inadequately heated water to the load.

To cure the above noted problems, the prior art employs a temperature controlled valve at the output of each heater. The prior art also employs separate thermostatic control of each heater and a delivery pump. This invention avoids the complexities of the prior art by designing flow control properties into the existing check valve.

Figure 2:
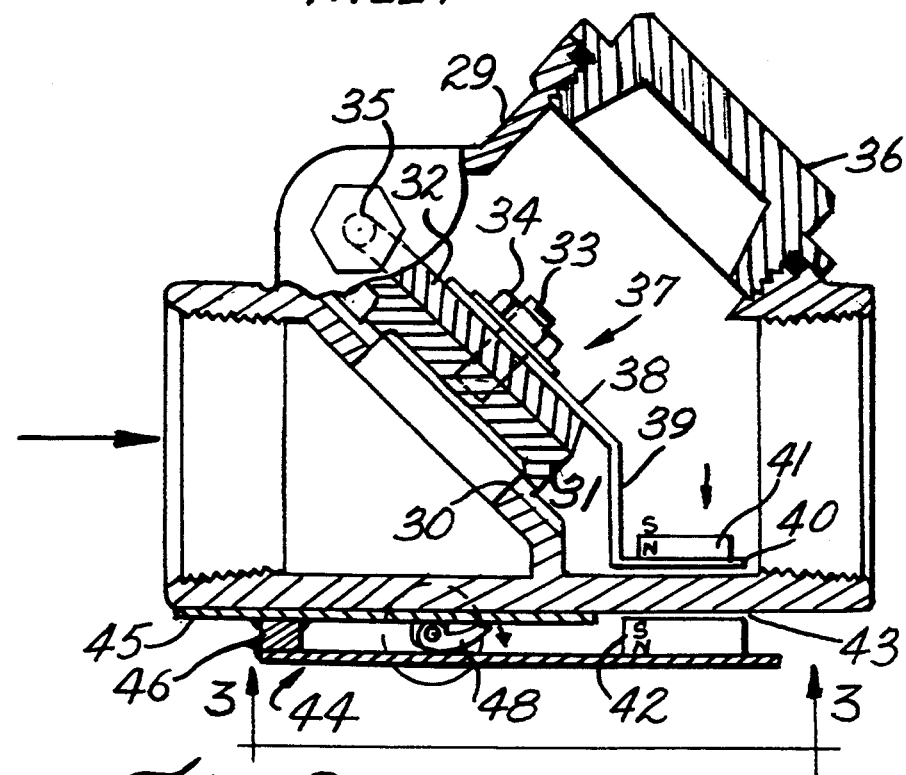
FIG. 2 is a cross-sectional view of a conventional swing type check valve modified in accordance with the invention.
Figure 3:
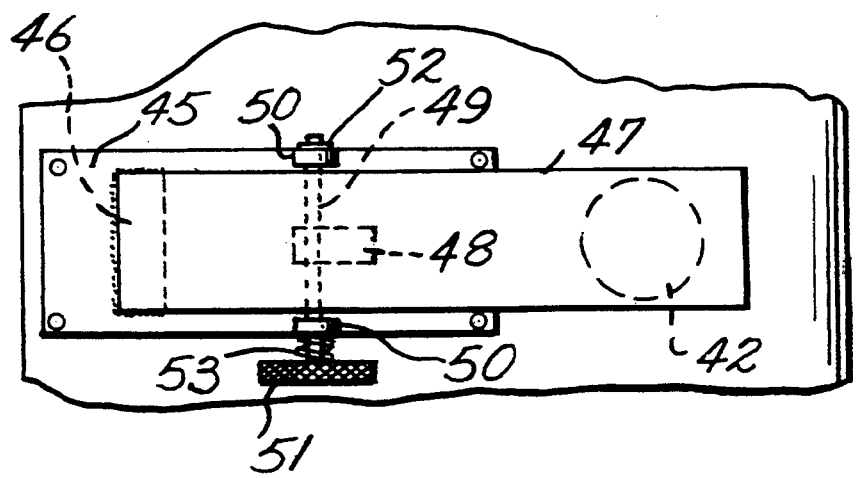
FIG. 3 is a view of the externally mounted magnet and adjustment as seen generally from the position indicated by the lines 3—3 in FIG. 2.

Referring now to FIGS. 2 and 3, a conventional swing type check valve is shown comprising a body 29 made of brass or any suitable noncorrosive, nonmagnetic material. Housed within the valve body is a valve seat 30 and associated valve disc 31. The valve disc is secured to a valve lever 32 by means of a threaded stud 33 and locking nut 34. The valve lever is arranged to pivot around a shaft 35 which runs through the body in a fluid tight relationship. The valve disc 31 and lever 32 are urged by gravity to rock around shaft 35 to seat the disc against the valve seat. A removable plug 36 is provided in the valve body for cleaning and inspection purposes.

The check valve thus far described is of conventional construction. Water flowing in the direction of the arrow pivots valve disc 31 around shaft 35 to permit flow. Water pressure acting in the opposite direction urges valve disc 31 against seat 30 to prevent flow.

The valve is modified by removing plug 36 and unscrewing locking nut 34. A relatively rigid flat strip of noncorrosive material 37 is mounted on stud 33 by means of a mounting hole and fastened to valve lever 32 by tightening nut 34. The strip 37 is formed into three sections 38, 39 and 40. Section 38 lies flat on the valve lever 32 and disc 31; section 39 is bent at an angle slightly off vertical in the direction away from the valve seat; and section 40 lies in a generally horizontal position in relation to the normal horizontal valve mounting position. A magnet or magnetizable material 41 is secured to an upper surface of section 40 by means of any suitable bonding method. The magnet 41 and support 40 assume a position of rest with a small fixed gap between support 40 and the valve body. The magnet is located approximately 180 degrees from pivot shaft 35. The weight of the magnet and its mounting lever provide an additional force acting to hold valve disc 31 on seat 30.

A second magnet 42 is mounted outside the valve body in opposed relationship to the first magnet 41. The magnets 41 and 42 are poled to attract each other as shown by the designation S, N. The valve body being of nonmagnetic material permits the passage of magnetic flux between the magnets. The force of attraction on magnet 41 is a function of gap 43 between magnet 42 and the valve body. Since magnet 41 is mounted on a relatively stiff lever arm 37, it can be seen that the pressure needed to open valve 31 would depend on the magnetic force between magnets 41 and 42 which in turn depends on the extent of gap 43.

In order to adjust gap 43, magnet 42 is mounted on a mechanical adjusting assembly 44 secured to the bottom of the valve body. Assembly 44 comprises a flat mounting plate 45. A spacer rod 46 is mounted at one end of plate 45. A stiff flat spring 47 is secured to the spacer rod to overlie the mounting plate in spaced relation. Magnet 42 is mounted on one end of spring 47 to move with respect to fixed spacer rod 46 at the other end of the spring. A cam 48 of a preselected contour is mounted on a supporting shaft 49 between flat spring 47 and the mounting plate to apply a flexing force to the spring. Shaft 49 is supported by spaced bearings 50 and is rotated by disc 51 with adjustment indicia on the circumference. A stop nut 52 prevents withdrawal of shaft 49 at one end, and a compression spring 53 is mounted on the other end to supply the necessary friction to maintain the cam in its preselected adjusted position.

The mounting plate of the mechanical adjusting assembly is secured to the bottom of the valve body by any suitable fastening means to remain securely fixed to the body with magnet 42 overlying magnet 41. A housing, not shown, can be snapped over the mounting assembly to keep out dirt and moisture.

It can be seen from the above that by turning adjusting disc 51, the cam 48 is rotated flexing spring 47 and placing magnet 42 a predetermined distance from magnet 41. The magnetic pull on magnet 41, as determined by the settable gap, acts as additional closing force on disc valve 31. The pressure necessary to open the check valve to flow is thus proportionately increased. In this manner, the water pressure needed to open and close the valve can be preset by manipulating the adjusting cam 48.

While a specific adjusting mechanism for magnet 42 has been shown and described, it should be understood that many other mechanical arrangements to space the magnet from the valve body may be employed that are within the purview of this invention.

Figure 4:
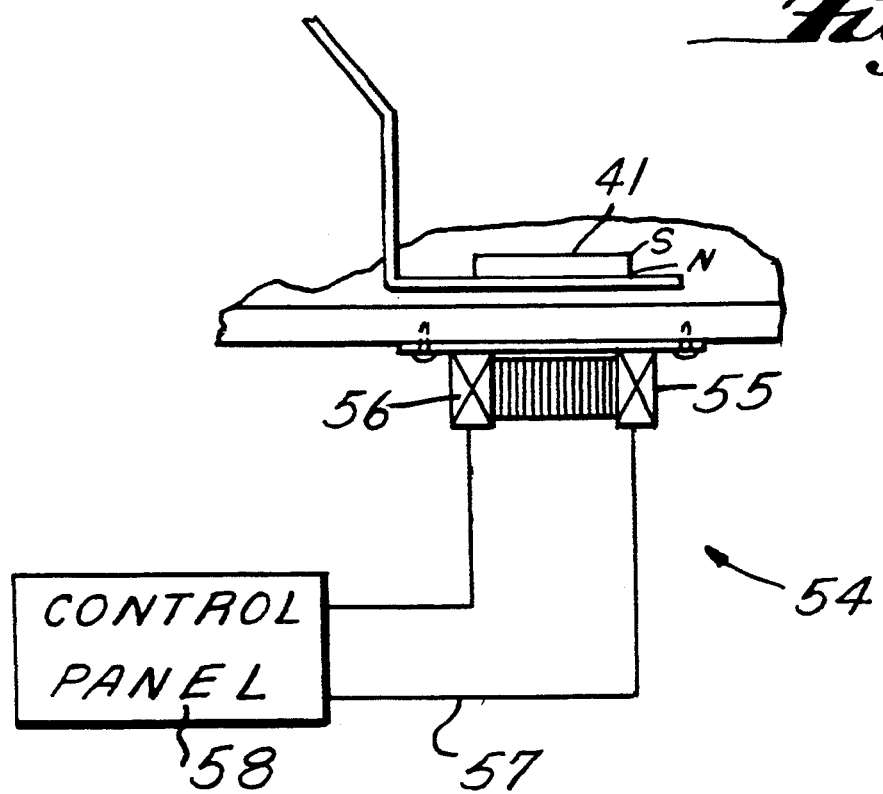
FIG. 4 is another embodiment of the swing type check valve showing an electrically controlled external magnetic adjustment.

FIG. 4 shows the basic valve of FIG. 2 with an electrically controlled magnetic biasing circuit 54 substituted for the mechanical adjusting assembly 44. The same reference numerals used in FIG. 2 will be used in FIG. 4 to designate similar components.

The biasing circuit 54 comprises a solenoid coil 55 with a soft iron core 56 mounted on the valve body with the core opposed to magnet 41. The coil 55 is energized by current in feed lines 57 connected to a control panel 58. The control panel may include state of the art circuitry to monitor and adjust the current in coil 55 thereby changing the magnetic pull on magnet 41 and the opening and closing pressure on the check valve. In this manner, the check valve may be utilized in systems responding to many temperature, pressure and flow requirements. The individual check valves may be adjusted as needed according to a priority system necessary in prioritizing flows in any system wherein staging is necessary, hence the designation priority valve.

Referring back to the system of FIG. 1 where priority check valves 18, 19 and 20 are all of the type shown in FIGS. 2 and 3, the system is set up to operate as follows. Step one involves selecting one of the heaters 10, 11, 12, in this case heater 10, as the lead heater. With balancing valves 26, 27, 38 in the fully open position, cam 48 of priority valve 18 is adjusted to space magnet 42 at the maximum setting of gap 43. The magnetic override now being disabled, priority valve 18 acts as a conventional check valve and cold water enters heater 10 at the expense of heaters 11 and 12 which remain blocked since priority valves 19 and 20 remain in the magnetic blocking mode.

Step two involves adjusting cam 48 on priority valve 19 so that magnet 42 is separated from the valve body at gap 43 but still within range to magnetically bias magnet 41. Manually increase the load through the system until lead heater 10 has reached 100% capacity as determined by the rating of the heater. Slowly throttle balancing valve 26 until lead heater 11 is operating between 75% and 80% capacity. By partially restricting flow through balancing valve 26, a slight back pressure will be reflected back down the cold water supply line 14 causing priority valve 19 to open against the initially set magnetic bias. Heater 11 will begin firing as cold water enters the heater causing the internal thermostatic to energize the burner.

Step three involves manually increasing the system load until heater 11 is operating at 100% capacity. Slowly throttle balancing valve 27 until heater 11 is operating at 75% to 80% capacity. By partially restricting flow through balancing valve 27, a slight back pressure will be reflected back down the cold water supply line which will be added to the back pressure from step 2 to cause priority valve 20 to open. Cold water entering heater 12 will cause the internal thermostat to ignite the burner.

Step four involves manually increasing the system load until heater 12 is operating at 100% capacity. Slowly close balancing valve 28 until all three heaters are operating at approximately the same load. This can be easily determined by measuring the outlet hot water temperature of each heater. These temperatures should be fairly uniform. The system is now balanced.

The procedure outlined above to set a three bank system is applicable to any number of heaters in a bank. It is only necessary to repeat Step three for each additional heater between the lead heater and the last heater.

In order to even out the wear on the heaters, the lead heater should be rotated at regular intervals. This can be easily accomplished by adjusting the cam on the present lead heater to a minimum air gap and adjusting the cam on the new lead heater to a maximum air gap. The heater in between should be adjusted for an air gap between the two positions.

As applied to FIG. 1 here, with heater 12 selected as the new lead heater, priority valve 18 is readjusted for minimum or no air gap 43 with resultant maximum opening pressure. Priority valve 20 is adjusted for maximum air gap and minimum opening pressure. Priority valve 19 is adjusted for an air gap between the settings of priority valves 18, 20. In operation, lag heater 11 will follow lead heater 12 and lag heater 10 will follow heater 11.

The indicia on adjusting disc 51 can serve as a guide in helping set the opening pressure of the priority valves. The rule to be followed is the smaller the air gap 43, the greater the opening pressure, and vice versa.

From the above description, it can be seen that this invention provides an elegant and unique solution to the problem of staging a bank of hot water heaters to respond most effectively to wide changes in load. Temperature sensing control has been replaced with back pressure sensing control. Back pressure is directly proportional to total flow and is more accurate. In this regard, it eliminates thermal lag which is the principal negative aspect of temperature controlled staging systems.

While the invention has been described in terms of a hot water heating system, it should be clearly understood that it may have many other applications. For example, it may be applied to the problem of staging plural fluid sources to feed a variable load in chilled water air conditioning systems, hydronic heating and fire protection systems. Also, the priority valve per se may have many applications other than in hot water heating. For example, the FIG. 2 valve requires no outside power source and may be used in explosive environments.

I claim:

1. A hot water heating system comprising a bank of two or more hot water heaters, a cold water inlet distribution line, cold water branch lines connecting said hot water heaters to said cold water inlet distribution line, a check valve in each said cold water branch lines to prevent backflow from said heaters, a hot water distribution line, hot water branch lines connecting said heaters to said hot water distribution line, a balancing valve in each of said hot water branch lines; and wherein said check valve includes means for presetting the opening flow pressure, said check valve comprises a non-magnetic body, a valve seat in said body, a valve disc, a pivoted valve lever for supporting said disc for pivotal closing and opening movement with respect to said seat, a support arm having first and second ends, said first end of said support arm being secured to said valve lever and valve disc for swinging movement therewith, the second end of said support arm supporting a magnet, said means for presetting mounted externally of said body and opposite to said support arm supported magnet.

2. The combination of claim 1 wherein said check valve includes an internal shaft, said pivoted valve lever carrying said valve disc and said support arm being pivotally supported by said shaft, the second end of said support arm having a bent portion which lies generally parallel to an internal portion of said valve body, said bent portion supporting said magnet.

3. The combination of claim 2 wherein said bent portion of said support arm supports said magnet at a location generally opposite said internal shaft and spaced a small distance from said internal valve body when said valve is in said closed position.

4. The combination of claim 3 wherein said means for presetting includes magnetic means.

5. The combination of claim 4 wherein said external magnetic means comprises a permanent magnet and means adjustably mounting said permanent magnet to preset the spacing gap between said permanent magnet and said valve body opposite said support arm supported magnet.

6. The combination of claim 5 wherein said means for adjustably mounting said permanent magnet comprises a flat spring, said spring secured at one end to said body in spaced relationship, the other end of said spring supporting said permanent magnet, cam means acting between said flat spring and said body to set said spacing gap.

7. The combination of claim 6 including a rotatable shaft supporting said cam, an adjusting dial fixed to said shaft, and indicia on said dial indicating a measure of said gap.

* * * * *